June 10, 1952     P. E. DIEDERICH     2,600,219
CRANKCASE VENTILATOR FILTER
Filed May 26, 1949
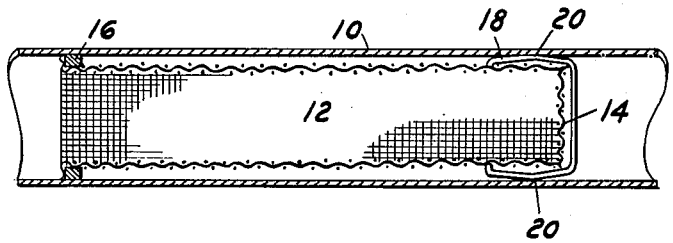
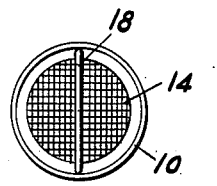
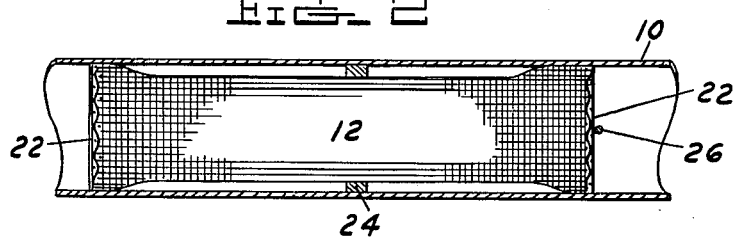
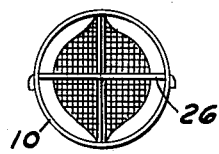
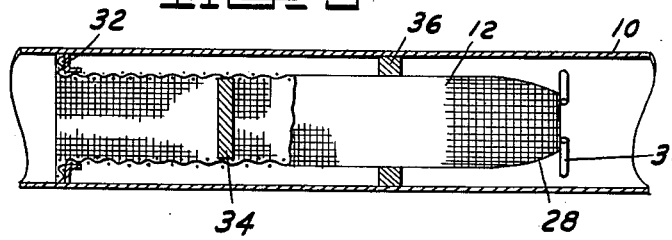
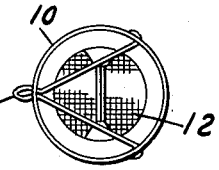
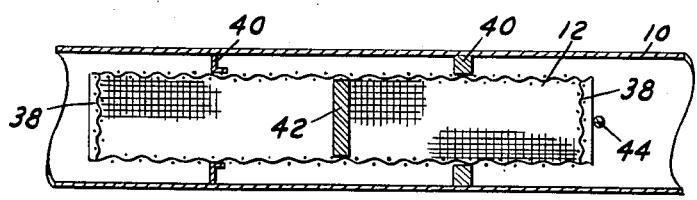
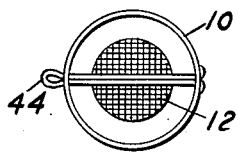
INVENTOR.
Paul E. Diederich
BY
Burton & Parker
ATTORNEYS Patented June 10, 1952

2,600,219

UNITED STATES PATENT OFFICE 2,600,219

CRANKCASE VENTILATOR FILTER

Paul E. Diederich, Grosse Pointe Park, Mich.

Application May 26, 1949, Serial No. 95,517

3 Claims. (Cl. 183—73)

This invention relates to an improved air filter for pipes and particularly ventilator pipes.

One specific embodiment of the invention resides in the provision of an air filter for a ventilator pipe such as the ventilator outlet pipe or breather pipe of an automobile engine crank case, though obviously this filter is adaptable for use in association with any pipe wherein it is desired to filter air or gas passing through the pipe.

An object of the invention is to provide such a filter which is simple and inexpensive and which is capable of being quickly and easily inserted into a pipe or removed therefrom for cleaning or replacement.

Automobile engine crank cases are commonly provided with outlet ventilator pipes for the exhaust or foul gases from the crank case from a point outside and generally underneath the vehicle body. When the vehicle is travelling over a dusty road at a low rate of speed it is not uncommon for air carrying dust or other foul particles to be sucked back into the crank case through the pipe. Such a result is undesirable and the use of filters associated with the ventilator pipe has been suggested.

I propose to provide a filter which is not only inexpensive and capable of being inserted in place within the ventilator outlet pipe or removed therefrom by any operator and which is effective in its functioning but which comprises a cylindrical filter member or screen so mounted within the interior of the pipe and so constructed that the air passing through the pipe is caused to pass through the filter element and to be cleaned thereby. My cylindrical filter element is supported within the pipe spaced from the wall thereof and barriers are associated therewith to cause the air to pass through the cylindrical filter wall of the element one or more times.

Various other advantages and meritorious features of my improved air filter will more fully appear from the following description, claims and accompanying drawing, wherein:

Fig. 1 is a section partly in elevation through a portion of a ventilator pipe provided with my improved filter;

Fig. 2 is a section partly in elevation through a portion of a ventilator pipe provided with a modified embodiment of my improved filter;

Fig. 3 is a section partly in elevation through a portion of a ventilator pipe provided with a second modification of my improved filter;

Fig. 4 is a section partly in elevation through a portion of a ventilator pipe provided with another modification of my improved filter;

Fig. 5 is an end view of Fig. 1;
Fig. 6 is an end view of Fig. 2;
Fig. 7 is an end view of Fig. 3; and
Fig. 8 is an end view of Fig. 4.

In the several figures of the drawing a ventilator pipe of a form common to crank case ventilator outlet pipes or breather pipes is indicated by the numeral 10. The term "ventilator pipe" is intended to cover a ventilator pipe, breather pipe, or any other similar gas or air passage pipe. Mounted within this outlet pipe is my improved air or gas filter. This filter is shown in the form of a generally cylindrical screen element 12. By screen I mean any suitable filter cloth or foraminous fabric of a screen-like character which is adapted to filter out air borne particles as the air passes through the screen. The character and mesh of the screen fabric would be such as was found suitable for the particular use to which the filter was to be applied.

In Fig. 1 the filter element 12 is shown as of a cylindrical shape of a diameter less than the interior diameter of the pipe 10. One end is closed by a screen filter wall 14. The opposite end is here shown as open. A circular ring or gasket 16 is secured to and surrounds the opposite end of the cylindrical filter 12. This ring may be of any suitable material, such as cork, synthetic rubber, metal, or any desired substance. It supports the cylindrical filter 12 spaced from the wall of the pipe and closes the space between the cylindrical wall of the filter and the pipe.

At the opposite end a spring element 18 of a bale-like shape is shown as embracing the end of the cylindrical filter. The two ends of the member 18 engage the side wall of the filter screen. The member 18 is bowed outwardly upon opposite sides at points 20 so as to frictionally engage within the pipe to support the end of the filter spaced from the wall of the pipe as shown. It is possible to readily insert this filter through one end of the pipe or to withdraw the same therefrom for cleaning or replacement. Any air passing through the pipe 10 would have to pass through one thickness of the filter screen.

Fig. 2 illustrates a modified form of filter wherein the cylindrical screen element 12 is shown as having opposite ends pinched together along diametrical lines 22. The wall of the screen may be secured together in any manner along these lines. The line of securement has a length greater than the normal diameter of the cylindrical screen. It is a fishtail-like construction. The ends may have a width sufficient to frictionally engage within the interior of the pipe to assist in supporting the filter element therein or one or both ends may be reduced in size. One of the ends might be closed as shown in Fig. 4 or finished in any other way desired.

Associated with the cylindrical filter is a ring 24 shown as encircling the filter spaced between its ends and constituting a barrier to passage of air through the space inside of the pipe and outside of the screen wall of the filter which causes any air passing through the pipe to flow at least twice through the screen mesh of the filter. This ring may be formed of any suitable material as heretofore described in connection with the ring 16.

In the end elevation of the embodiment shown in Fig. 6 a pin 26 is illustrated as extending diametrically across the pipe and engaging the end of the filter to hold the same in place.

In Fig. 3 the screen filter element 12 is shown as tapered at the end 28. It is somewhat cigar-shaped. Such end is formed of the filter cloth itself and constitutes a filter portion. A cotter pin 30 is shown as extending through the pipe 10 and having its two arms spread apart and engaging the tapered end of the filter to hold it in place. The opposite end of the filter is provided with a supporting ring 32 to which the filter cloth is attached as by soldering or in any suitable manner. This ring constitutes an air barrier within the pipe outside of the filter wall. At this end the filter is open. Obviously, it might be closed as shown at 14 in Fig. 1.

The interior of the filter is provided spaced from this open end with an impermeable barrier 34. The filter is provided spaced between this barrier 34 and its tapered end with an encircling barrier ring 36 which grippingly engages the filter and is yieldingly receivable within the pipe and serves not only to support the filter spaced from the wall of the pipe but to act as a barrier to the flow of air within the pipe outside of the body of the filter. In this construction the air would be caused to pass at least three times through the screen mesh of the filter.

In Figs. 4 and 8 another modification is shown wherein the elongate cylindrical filter element 12 is provided with filter closures 38 for each end. A pair of encircling supporting barrier rings 40 are shown as associated with the filter encircling the body thereof, supporting the same spaced from the wall of the pipe and constituting barriers to the flow of air through the pipe outside of the filter body. A barrier disc 42 is shown within the body disposed between the outside rings 40. A cotter pin 44 is shown as extending through the pipe engaging one end of the filter to hold it in place. In this construction the air would be caused to pass at least four times through the filter cloth.

It is apparent that a filter constructed according to the above disclosure could be provided to increase or decrease the filtering capacity. It is desired in the use of such a filter in a crank case outlet pipe that no undesirable back pressure be applied to the escape of foul gases from the crank case and that back flow of air through the filter pipe into the crank case be obstructed so as to filter out dust and other particles.

What I claim is:

1. In combination with a ventilator pipe a generally cylindrical filter screen receivable within said pipe, said cylindrical filter screen having both ends closed by the wall of the screen at each end being pinched together along a line extending diametrically of the cylindrical screen, said end portions along said lines having a diameter greater than the diameter of the cylindrical portion of the filter screen and adapted to engage the pipe to support the cylindrical screen within the pipe spaced from the pipe wall, and an impermeable barrier encircling said cylindrical screen spaced between its closed ends so that the air passing through the pipe must pass through the screen.

2. In combination with a ventilator pipe a generally cylindrical filter screen receivable therein spaced from the wall thereof, said cylindrical filter screen having its wall at one end at least pinched together along a line of greater length than the diameter of the cylindrical portion of the screen, said cylindrical filter screen having a barrier ring encircling its cylindrical portion and adapted to engage the wall of the pipe within which the screen is positioned and obstruct the flow of gas therethrough outside of the cylindrical portion of the filter screen causing the gas to pass through the screen.

3. In combination with a ventilator pipe a generally cylindrical filter screen receivable within said pipe with its cylindrical portion spaced from the wall of the pipe, said cylindrical filter screen having its wall at one end at least pinched together along a line of greater length than the diameter of the cylindrical portion of the screen and adapted to engage the pipe wall, said filter screen having a part encircling its cylindrical portion spaced from said end and engaging the pipe wall and serving with said end to support the cylindrical portion of the screen spaced from the wall of the pipe within which the screen is disposed, said part serving to close the space between the filter screen and the wall of the pipe so that the air passing through the pipe is caused to pass through the screen.

PAUL E. DIEDERICH.

REFERENCES CITED

The following references are of record in the file of this patent:

UNITED STATES PATENTS

| Number | Name | Date |
| --- | --- | --- |
| 961,423 | Sturtevant | June 14, 1910 |
| 983,352 | Cox | Feb. 7, 1911 |
| 993,152 | Caracristi | May 23, 1911 |
| 1,554,534 | Straussler | Sept. 22, 1925 |
| 1,839,379 | Downing | Jan. 5, 1932 |
| 1,864,622 | Sutherland | June 28, 1932 |